(12) United States Patent
Sano et al.

(10) Patent No.: US 12,128,379 B2
(45) Date of Patent: Oct. 29, 2024

(54) FLUIDIZED BED GRANULATOR OR FLUIDIZED BED/SPOUTED BED GRANULATOR

(71) Applicant: Toyo Engineering Corporation, Tokyo (JP)

(72) Inventors: Keishi Sano, Narashino (JP); Genshi Nishikawa, Narashino (JP); Kimihito Haruta, Narashino (JP); Katsunori Yagoh, Narashino (JP); Masashi Takahashi, Narashino (JP); Yuichiro Wakashima, Narashino (JP); Keiji Mase, Tokyo (JP); Shozo Ishibashi, Tokyo (JP); Tetsuya Kawabe, Tokyo (JP)

(73) Assignee: TOYO ENGINEERING CORPORATION, Tokyo (JP)

( * ) Notice: Subject to any disclaimer, the term of this patent is extended or adjusted under 35 U.S.C. 154(b) by 184 days.

(21) Appl. No.: 17/909,149

(22) PCT Filed: Feb. 8, 2021

(86) PCT No.: PCT/JP2021/004616
§ 371 (c)(1),
(2) Date: Sep. 2, 2022

(87) PCT Pub. No.: WO2021/176959
PCT Pub. Date: Sep. 10, 2021

(65) Prior Publication Data
US 2023/0088680 A1      Mar. 23, 2023

(30) Foreign Application Priority Data
Mar. 5, 2020   (JP) ................................ 2020-037641

(51) Int. Cl.
*B01J 2/16* (2006.01)

(52) U.S. Cl.
CPC ...................................... *B01J 2/16* (2013.01)

(58) Field of Classification Search
CPC ......... B01J 2/00; B01J 2/02; B01J 2/04; B01J 2/16; B22C 9/12; B22C 9/18
See application file for complete search history.

(56) References Cited

U.S. PATENT DOCUMENTS 4,219,589 A    8/1980  Niks et al.
4,749,595 A    6/1988  Honda et al.
(Continued)

FOREIGN PATENT DOCUMENTS

CA    2810165 A1 * 10/2013 ........... C01B 33/027
JP    5647181 B2      11/1981
(Continued)

OTHER PUBLICATIONS

International Search Report with English Translation issued in corresponding International Application No. PCT/JP2021/004616 date of mailing Apr. 20, 2021 (6 pages).
(Continued)

*Primary Examiner* — Robert M Kunemund
(74) *Attorney, Agent, or Firm* — FLYNN THIEL, P.C.

(57) ABSTRACT

A fluidized bed or fluidized bed/spouted bed granulator into which urea seed particles, an aqueous urea solution and air are introduced to produce urea particles with an average particle size of 1 mm or more. The granulator includes a box-shaped granulation chamber with a bottom floor, a top and side surfaces. Inner wall surfaces of the chamber are of a metal plate material, an upper part of the side or top surfaces includes an exhaust outlet, the side surfaces or top surface includes an inlet for introducing the seed particles, the side surfaces include a collection port for the particles, the aqueous urea solution is introduced from the bottom floor or the side surfaces, the air is introduced from the (Continued)

bottom floor or the bottom floor and the side surfaces, and at least a portion of the inner wall surfaces of the granulation chamber is treated by surface roughening.

12 Claims, 3 Drawing Sheets

(56) References Cited

U.S. PATENT DOCUMENTS

| | | | |
|---|---|---|---|
| 6,203,730 | B1 | 3/2001 | Honda et al. |
| 7,344,663 | B2 | 3/2008 | Nishikawa et al. |
| 8,834,142 | B2 | 9/2014 | Kojima et al. |
| 9,156,131 | B2 | 10/2015 | Mase |

FOREIGN PATENT DOCUMENTS

| | | | |
|---|---|---|---|
| JP | 61280382 | A | 12/1986 |
| JP | 6274443 | A | 4/1987 |
| JP | 463729 | B2 | 10/1992 |
| JP | 10216499 | A | 8/1998 |
| JP | 11137988 | A | 5/1999 |
| JP | 2002362991 | A | 12/2002 |
| JP | 2007167768 | A | 7/2007 |
| JP | 2007216126 | A | 8/2007 |
| JP | 2008230665 | A | 10/2008 |
| JP | 4455643 | B2 | 5/2009 |
| JP | 4836634 | B2 * | 12/2011 |
| JP | 201240744 | A | 3/2012 |
| JP | 2017119902 | A | 7/2017 |
| JP | 2017170408 | A | 9/2017 |
| WO | 2006094620 | A1 | 9/2006 |
| WO | 2015014447 | A1 | 2/2015 |
| WO | 2018007089 | A1 | 1/2018 |
| WO | 2019180155 | A1 | 9/2019 |

OTHER PUBLICATIONS

Written Opinion of International Searching Authority issued in corresponding International Application No. PCT/JP2021/004616 dated Apr. 20, 2021 (4 pages).

English Translation of the International Preliminary Report on Patentability, issued in corresponding International Application No. PCT/JP2021/004616, Date of Mailing Sep. 15, 2022 (6 pages).

* cited by examiner

FLUIDIZED BED GRANULATOR OR FLUIDIZED BED/SPOUTED BED GRANULATOR

FIELD OF THE INVENTION

The present invention relates to a fluidized bed granulator or fluidized bed/spouted bed granulator usable for producing, for example, urea particles.

BACKGROUND OF THE INVENTION

As granulators for particles such as, for example, urea particles, fluidized bed granulators using only a fluidized bed and fluidized bed/spouted bed granulators using a spouted bed and a fluidized bed in combination have been known (JP-A S62-74443, JP-A 2007-167768, JP-B 4455643 and WO-A 2006/094620).

Within granulation chambers of these granulators, an air-driven fluidized bed of urea particles, or a fluidized bed with which a spouted bed is present in a mixed manner is formed, such that, while seed crystals of urea as nuclei of urea particles (hereinafter, also referred to as seed particles) and an aqueous urea solution are continuously supplied thereto, urea particles with a predetermined size are granulated. However, within the granulation chambers, in general, a phenomenon in which dust (fine urea powder such as pieces of urea particles or the like) adheres to and deposits on the inner wall surfaces causes problems. This phenomenon is prominent especially in inner wall surfaces above the fluidized bed and dust which adheres thereto and deposits thereon up to a limit peels off to fall by its own weight as large lumps, which block an inlet for supplying the aqueous urea solution or impair the fluidizing of the fluidized bed. If such problems happen, it is required to stop the operation of the granulators in order to clean the inside of the granulators and leads to production loss, the elimination and suppression of the dust adhesion and deposition to/on the inner walls of the granulators are problems to be solved.

WO-A 2015/014447 discloses that surfaces of inside walls of a granulation reactor are coated with an organic silica compound, thereby being able to prevent the precipitation of dust and extend the interval of each cleaning of the granulation reactor.

JP-A 2008-230665 discloses that, in a powder handling apparatus, a steel surface which comes in contact with powder is provided with predetermined peaks and valleys, thereby enhancing the capability of the powder to peel off and slide down from the steel surface and preventing the adhesion of the powder.

JP-A 2017-170408 discloses a method for blasting a net-like filter to suppress the adhesion of powder or clogging.

WO-A 2018/007089 discloses that a pulsed deformation imparted by a shaking member to double inner walls of a granulator prevents or reduces the formation of encrustation due to the solidification of liquid urea which adheres to an internal wall, thereby reducing a cleaning frequency and enabling the long-term operation of a plant.

SUMMARY OF THE INVENTION

A problem to be solved by the present invention is, in fluidized bed granulators or fluidized bed/spouted bed granulators, to suppress the adhesion of dust to inner wall surfaces of granulation chambers in which granulated particles such as urea particles are produced, thereby reducing the number of cleaning of the granulation chambers and prolonging a continuous operating time.

The present invention provides, in one embodiment thereof, a fluidized bed granulator or fluidized bed/spouted bed granulator into which urea seed particles, an aqueous urea solution and air are introduced to produce urea particles with an average particle size (according to sieve analysis test method JIS Z8815, ASTM E11) of 1 mm or more, the fluidized bed granulator or fluidized bed/spouted bed granulator including a box-shaped granulation chamber including a bottom floor, a top surface facing the bottom floor and side surfaces between the bottom floor and the top surface, and including a bottom surface facing the bottom floor on the opposite side of the top surface, wherein inner wall surfaces of the granulation chamber are formed of a metal material, the top surface or an upper part of the side surfaces includes an exhaust outlet, the side surfaces or the top surface includes an inlet for introducing the urea seed particles, the side surfaces include an outlet for collecting the urea particles, the bottom floor or the side surfaces include inlets for introducing the aqueous urea solution, and the bottom floor or the bottom floor and the side surfaces include inlets for introducing the air, at least a portion of the inner wall surfaces of the granulation chamber is treated by surface roughening, and an arithmetic average roughness (Ra) (JIS B 0601:1994) of peaks and valleys in the surface treated by surface roughening is 0.35 to 5.0 µm and an average distance between local peaks (S) (JIS B 0601:1994) of the peaks and valleys is 2 to 300 µm.

In the fluidized bed granulator or fluidized bed/spouted bed granulator of the present invention, a portion or all of the inner wall surfaces of the granulation chamber is treated by surface roughening to have predetermined peaks and valleys, so that dust is difficult to adhere to and deposit on the surface treated by surface roughening. Thus, a cleaning frequency of the granulation chamber can be reduced and the granulator can be continuously operated for a long time.

Figure 1:
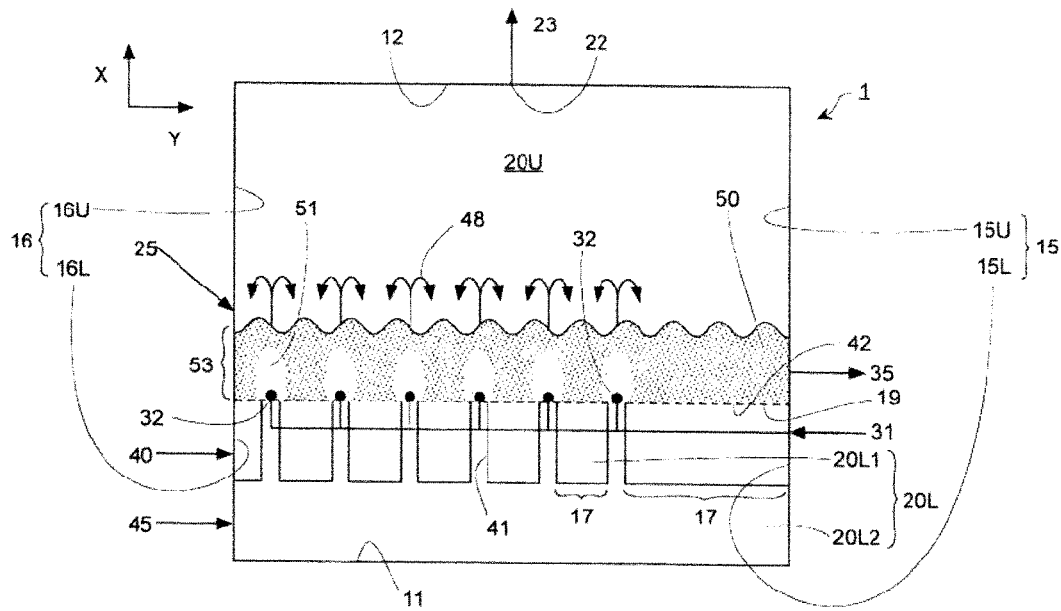
FIG. 1 is a front view schematically showing one embodiment of a fluidized bed/spouted bed granulator according to the present invention with a wall on the front side removed.
Figure 2:
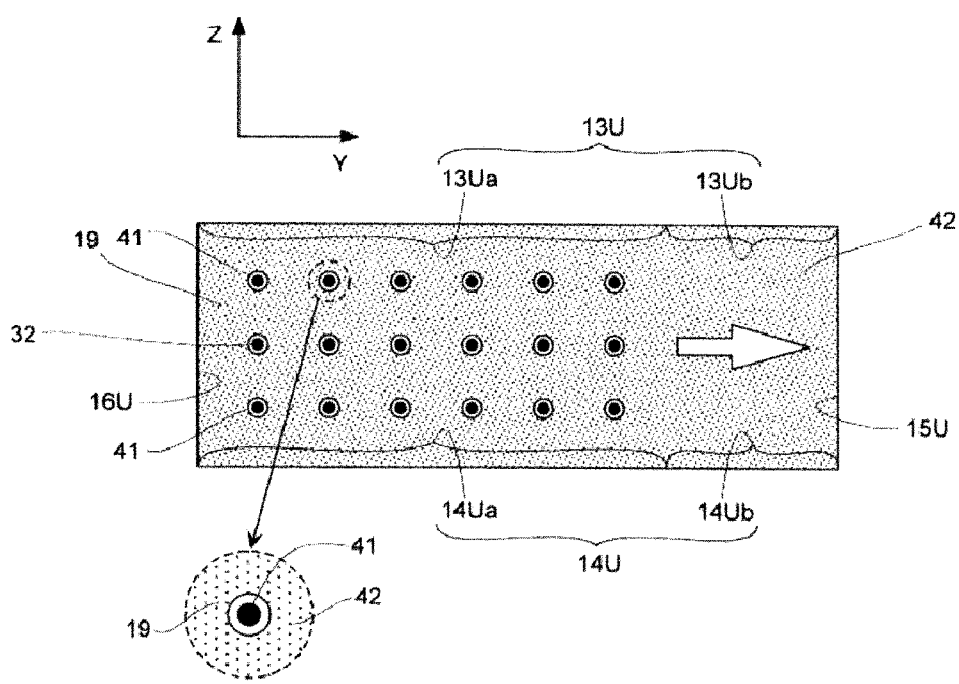
FIG. 2 is a plan view schematically showing a granulation chamber of the fluidized bed/spouted bed granulator of FIG. 1 with a top surface removed and a fluidized bed/spouted bed inside thereof omitted.
Figure 3:
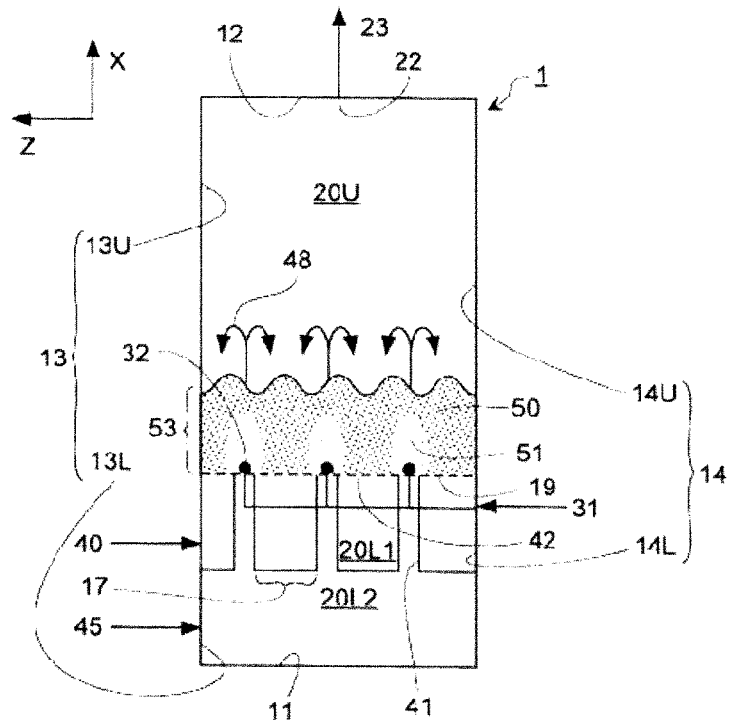
FIG. 3 is a side view schematically showing the fluidized bed/spouted bed granulator of FIG. 1 with a wall on the side of a side surface removed.

EMBODIMENTS OF THE INVENTION (1) Fluidized Bed/Spouted Bed Granulator Shown in FIGS. 1 to 3

Referencing to FIGS. 1 to 3, one exemplary embodiment of a fluidized bed granulator or fluidized bed/spouted bed granulator of the present invention is explained.

The fluidized bed granulator or fluidized bed/spouted bed granulator of the present invention can be used as an apparatus into which, for example, urea seed particles, an aqueous urea solution and air are introduced to produce urea particles with an average particle size of 1 mm or more. According to an example of the present invention, at least a portion of inner wall surfaces of a granulation chamber is treated by surface roughening to provide predetermined peaks and valleys.

The average particle size can be determined from results obtained by sieving according to the sieve analysis test method of JIS 28815, using sieves that meet the ASTM E11 standard. For example, it can be determined by measuring the mass of the samples remaining on the respective sieves and plotting the cumulative particle size distribution on a graph.

Thus, in the case where the granulator is a fluidized bed granulator, the present invention can be applied thereto as long as it is an apparatus with the granulation chamber in which a fluidized bed can be formed as a means for producing urea particles, and in the case of a fluidized bed/spouted bed granulator, the present invention can be applied thereto as long as it is an apparatus with the granulation chamber in which a fluidized bed and a spouted bed can be formed as a means for producing urea particles. Any configurations other than the aforementioned inner wall surfaces of the granulation chamber may include the same configurations as publicly-known granulators or configurations in which a portion of publicly-known granulators is altered.

Examples of publicly-known fluidized bed granulators can include those which are the same as shown in FIG. 1 of JP-B S56-47181, etc. or those which are partially altered therefrom depending on the purposes, and examples of publicly-known fluidized bed/spouted bed granulators can include those which are the same as shown in FIG. 3 of JP-A 2007-167768 or FIG. 1 of JP-B 4455643, etc. or those which are partially altered therefrom depending on the purposes, etc. In addition, fluidized bed granulators or fluidized bed/spouted bed granulators to which the present invention can be applied include not only granulators to be newly built but also existing granulators.

Hereinafter, explanation is made by referencing to a fluidized bed/spouted bed granulator (hereinafter, sometimes referred to as "granulator" for short) 1.

The granulator 1 includes a bottom surface 11, a top surface 12 facing the bottom surface 11 and four side surfaces 13 to 16 (13, 14, 15 and 16) located between the bottom surface 11 and the top surface 12, and the inside of the granulator 1 is divided into an upper inner space (granulation chamber) 20U and a lower inner space (air accumulation chamber) 20L (20L1 and 20L2) by a bottom floor 19 located between the bottom surface 11 and the top surface 12.

In the side surfaces 13 to 16, portions located above the bottom floor 19 form side surfaces 13U to 16U (13U, 14U, 15U and 16U) and portions located below the bottom floor 19 form 13L to 16 L (13L, 14L, 15L and 16L). Note that, hereinafter, when reference numerals of components are accompanied by "U," "U" means that the components are above the bottom floor 19 (on the side of the top surface 12), and when reference numerals are accompanied by "L," "L" means that the components are below the bottom floor 19 (on the side of the bottom surface 11).

In the box-shaped granulation chamber 20U, a fluidized bed 50 and a spouted bed 51 of urea particles are formed on the bottom floor 19 during operation of the granulator. The urea particles within the fluidized bed 50 and spouted bed 51 gradually move, while fluidizing as if to furiously dance, from the side of the side surface 16U to which a line for introducing urea seed particles 25 from which urea seed particles are supplied is connected toward the side of the side surface 15U to which a line for collecting urea particles 35 is connected (in a direction of a white arrow in FIG. 2) while increasing their particle size.

While, as shown in FIG. 2, a planar shape of the granulation chamber 20U is a rectangular, it is not limited to the rectangular and may be a square, a rectangular, a shape with a portion of a square deformed or any other shapes. The four side surfaces 13U to 16U are configured from a first long-side side surface 13U along the moving direction of the urea particles within the granulation chamber 20U and a second long-side side surface 14U facing the first long-side side surface 13U, and a first short-side side surface 15U and a second short-side side surface 16U facing the first short-side side surface 15U.

The bottom floor 19, the top surface 12 and the four side surfaces 13U to 16U that constitute the granulation chamber 20U are made of a metal material, for example, a plate-like metal material. The top surface 12 and the four side surfaces 13U to 16U may each be of a layered structure in which, as long as the inside surface (surface facing the granulation chamber 20U) is made of a metal material, the opposite side thereof (the outside of the metal material) is configured of a non-metal material such as concrete.

The bottom floor 19, the top surface 12 and the four side surfaces 13U to 16U may all be made of the same metal material, for example, metal plates, or may be partially include metal plates made of different metals. In some examples, a portion or all of the metal materials of the bottom floor 19, the top surface 12 and the four side surfaces 13U to 16U is preferably configured from iron or iron alloy (stainless steel or the like).

The second short-side side surface 16U of the granulation chamber 20U includes an inlet for introducing the urea seed particles at a position higher than the bottom floor 19 and the line for introducing the urea seed particles 25 is connected thereto.

To the top surface 12, an exhaust line 23 is connected, and a connection port of the exhaust line 23 is an exhaust outlet 22 of the granulation chamber 20U. The majority of the dust within the granulation chamber 20U is discharged along with air from the exhaust outlet 22 through the exhaust line 23 to the outside. The exhaust outlet 22 may be formed at a position at a height close to the top surface 12 in any of the first long-side side surface 13U, the second long-side side surface 14U, the first short-side side surface 15U or the second short-side side surface 16U.

In the granulator 1, below the granulation chamber 20U, an air accumulation chamber for fluidizing air 20L1 and an air accumulation chamber for spouting air 20L2 which are formed of the bottom surface 11, the side surfaces 13L to 16L, partition walls 17 and the bottom floor 19 are provided.

The bottom floor 19 is a perforated plate in which a number of small air holes 42 are provided, and in the perforated plate, outlets (upper ends) of spouting pipes 41 to supply air for forming a spouted bed are regularly arranged.

Figure 4:
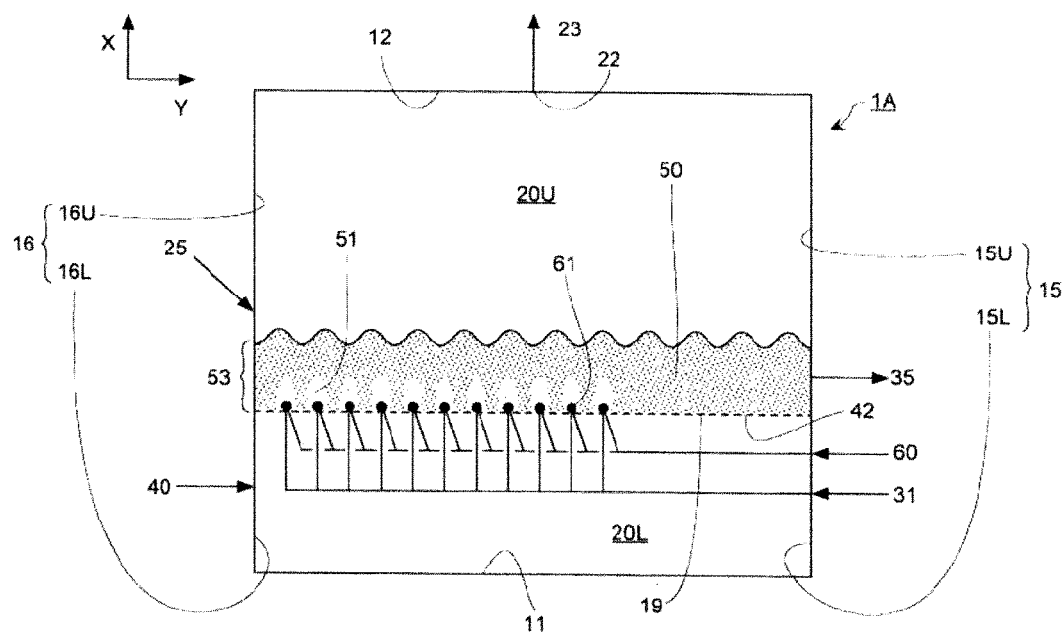
FIG. 4 is a front view schematically showing another embodiment of the fluidized bed/spouted bed-type granulator according to the present invention with a wall of the front side removed.
Figure 5:
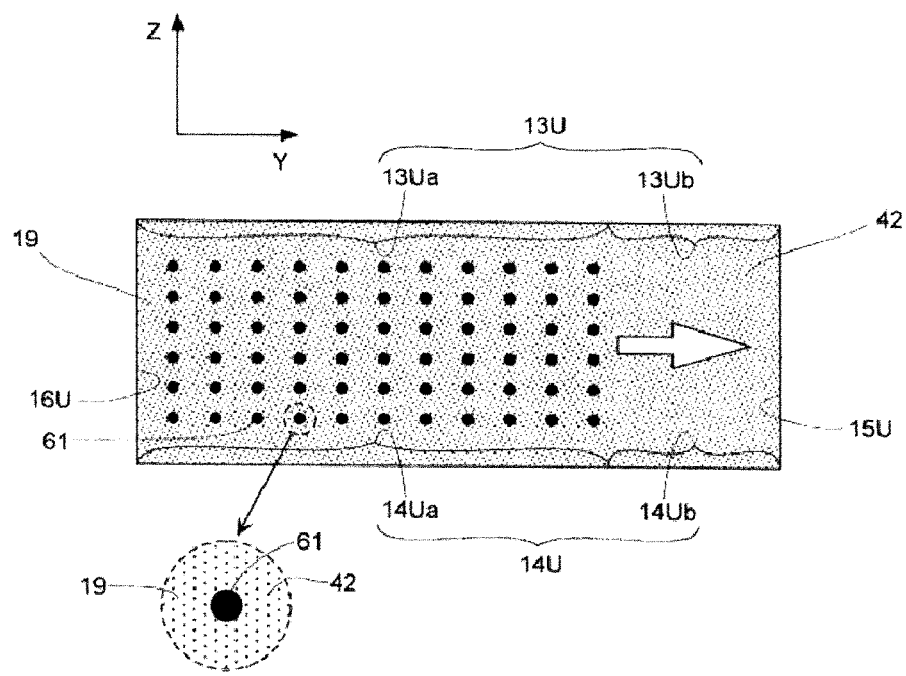
FIG. 5 is a plan view schematically showing a granulation chamber of the fluidized bed/spouted bed granulator of FIG. 4 with a top surface removed and a fluidized bed/spouted bed inside thereof omitted.
Figure 6:
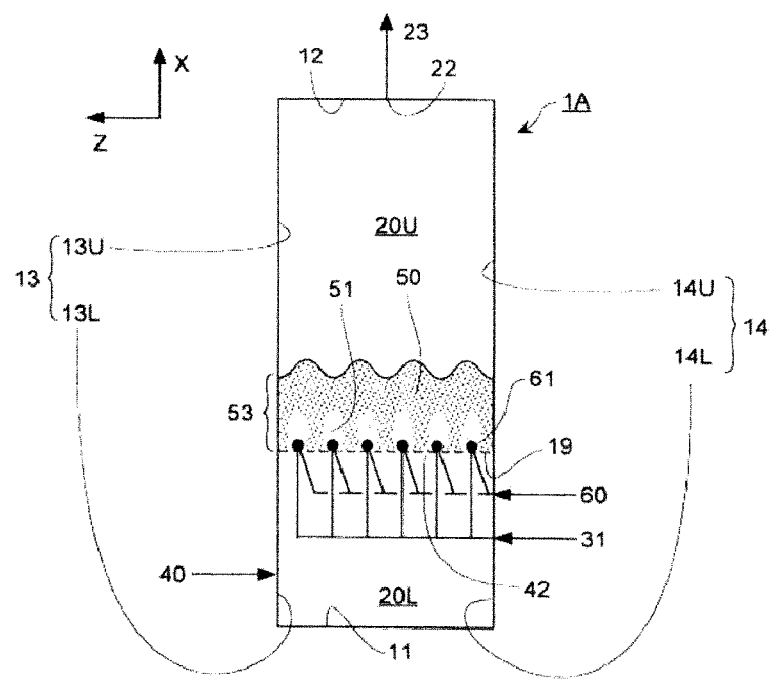
FIG. 6 is a side view schematically showing the fluidized bed/spouted bed granulator of FIG. 4 with a wall on the side of a side surface removed.

As the bottom floor 19 formed of the perforated plate in which the outlets of spouting pipes 41 to supply the spouting air are regularly arranged, for example, a perforated plate shown in FIG. 4 of JP-B 4455643 (which corresponds to the bottom floor 19 of FIG. 1 of the present invention), a perforated plate shown in FIG. 9 of the same (which corresponds to the bottom floor 19 of FIG. 1 of the present invention), perforated plates shown in FIGS. 5 and 6 of the same, or perforated plates improved from them can be used.

In the case of the granulator 1 as shown in FIG. 1, air for forming the fluidized bed is once supplied from a line for introducing the fluidizing air 40 to the air accumulation chamber for the fluidizing air 20L1 provided below the bottom floor 19, and thereafter, introduced to the granulation chamber 20U through the air holes 42 of the bottom floor 19. The spouting air is once supplied from a line for introducing the spouting air 45 to the air accumulation chamber for the spouting air 20L2 provided below the air accumulation chamber for the fluidizing air 20L1, and thereafter, introduced to the granulation chamber 20U through the spouting pipes 41.

The spouting air is supplied from the outlets of the spouting pipes 41 regularly arranged in the bottom floor 19 of the granulation chamber 20U, and forms, in the fluidized bed 50, the spouted bed 51 which is a region where the particles are sparsely present. An aqueous urea solution is introduced from a line for introducing the aqueous urea solution 31 and sprayed into the spouted bed 51 within the granulation chamber 20U from a nozzle for spraying the aqueous urea solution 32 located about the center of each outlet surface of the spouting pipes 41.

The particles are accelerated by the spouting air in the spouted bed 51 to leap into a space above the fluidized bed 50 as indicated by arrows 48, and thereafter, lose momentum and fall into the fluidized bed 50 and are caught in the surrounding spouted bed 51, and droplets of the aqueous urea solution are sprayed thereto again. As the sprayed droplets of urea repeatedly adhere to and are dried and layered on the surface of the urea particles in the spouted bed 51, the seed particles supplied into the granulation chamber 20U grow into urea particles with a predetermined size.

In the example of FIG. 1, as shown in FIGS. 2 and 3, six spray nozzles 32 are arranged in Y-direction and three in Z-direction orthogonal to Y-direction. The number of the spray nozzles 32 can be adjusted based on amounts of the urea particles to be produced in the granulator 1 and the arrangement of the spray nozzles 32 can be adjusted based on the shape of the granulator.

A range in which the nozzles for spraying the aqueous urea solution 32 are arranged is a range sandwiched between a region indicated by 13Ua of the first long-side side surface and a region indicated by 14Ua of the second long-side side surface, and in a range sandwiched between a region indicated by 13Ub of the first long-side side surface and a region indicated by 14Ub of the second long-side side surface, the spray nozzles 32 are not arranged.

A proportion of a Y-direction length of the region 13Ua occupying a Y-direction length of the first long-side side surface 13U (or a Y-direction length of the region 14Ua occupying a Y-direction length of the second long-side side surface 14U) is determined considering comprehensively the number of the nozzles for spraying the aqueous urea solution 32 arranged in the granulator, temperature requirements of the urea particles collected from the line for collecting the urea particles 35, shapes of buildings in which the granulator is placed and the like.

The first short-side side surface 15U is provided with an outlet for the urea particles, which is connected to the line for collecting the urea particles 35. Of the urea particles flowed out to the line for collecting the urea particles 35, particles that fall within a predetermined particle size range are separated by a sieve or the like and sent to the next step as a product, while particles that fall below the range and particles that exceed it may be supplied again, respectively as they are and after crushed into small pieces by a crusher or the like, to the granulation chamber 20U from the line for introducing the urea seed particles 25.

Based on the number of required seed particles, the particles that fall within the predetermined particle size range may also be crushed into small pieces and supplied again to the granulation chamber 20U from the line for introducing the urea seed particles 25.

A portion or all of inner wall surfaces of the granulation chamber 20U is treated by surface roughening. Here, the inner wall surfaces of the granulation chamber 20U are inner wall surfaces of the bottom floor 19, the side surfaces 13U to 16U and the top surface 12 that constitute the granulation chamber 20U.

When a portion of the inner wall surfaces is treated by surface roughening, it is preferable that portions of a height range from the bottom floor 19 up to the top surface 12 at least in the side surfaces 13U and 14U are treated by surface roughening, and it is more preferable that portions of a height range from the bottom floor 19 up to the top surface 12 in the side surfaces 13U to 16U are treated by surface roughening. Such side surfaces as treated by surface roughening can be side surfaces not including the inlet for introducing the urea seed particles or the outlet for the urea particles. In the side surfaces 13U to 16U, a range of a height of the portion treated by surface roughening is preferably a range that includes a height 53 (a range in X-direction) which is above the bottom floor 19 and in which the fluidized bed 50 is formed during operation of the granulator.

In the side surfaces 13U to 16U, the range that includes the height 53 in which the fluidized bed 50 is formed during operation includes a range from the bottom floor 19 up to the height 53 in which the fluidized bed 50 is formed during operation and a range on the side of the top surface 12 above the height 53 in which the fluidized bed 50 is formed during operation, and the latter is preferably a range 1 time to 10 times and more preferably a range 3 times to 9 times of the height 53 in which the fluidized bed 50 is formed during operation.

The height 53 in which the fluidized bed 50 is formed during operation is preferably in the range of 100 to 1000 mm, although it varies depending on sizes or operating conditions of the granulator 1.

When a portion of the inner wall surfaces of the granulation chamber 20U is treated by surface roughening, the range treated by surface roughening in the side surfaces 13U and 14U preferably includes, in the direction from the side surface 16U toward the side surface 15U (Y-direction), a range corresponding to which the nozzles for spraying the aqueous urea solution 32 are disposed. Specifically, for example, as shown in FIG. 2, it preferably includes ranges of the region 13Ua of the first long-side side surface and the region 14Ua of the second long-side side surface that face the range in which the spray nozzles 32 are arranged.

When a portion of the inner wall surfaces of the granulation chamber 20U is treated by surface roughening, in addition to at least the aforementioned portion of the side surfaces 13U to 16U, a portion of the top surface 12 is preferably further treated by surface roughening. When a portion of the top surface 12 is treated by surface roughening, the range treated by surface roughening in the top surface 12 more preferably includes a circumference with a width of 100 to 1000 mm along a boundary between the top surface 12 and the side surfaces 13U to 16U and a circumference with a width of 100 to 1000 mm along a boundary between the top surface 12 and the exhaust outlet 22.

The arithmetic average roughness (Ra) (JIS B 0601:1994) of the roughening-treated state (peaks and valleys) of the roughening-treated inner wall surface of the granulation chamber 20U is 0.35 to 5.0 µm and the average distance between local peaks (S) (JIS B 0601:1994) of the peaks and valleys is 2 to 300 µm and more preferably 2 to 50 µm. The roughening-treated state (peaks and valleys) of the inner wall surface with numerical values within the above ranges is the most efficient for suppressing dust adhesion to the roughening-treated surface.

In the granulation chamber 20U, when a portion of the inner wall surfaces of the side surfaces 13U to 16U is treated by surface roughening, the roughening-treated surface can include first and second roughening-treated surfaces that are treated as two types of different roughening-treated surface forms.

A range of the first roughening-treated surface covers, in the height direction (X-direction of FIG. 1) of at least the side surfaces 13U and 14U, the range from the bottom floor 19 up to the height 53 in which the fluidized bed 50 is formed during operation and the range on the side of the top surface above the height 53 in which the fluidized bed 50 is formed during operation, and the latter is preferably a range 1 time to 10 times and more preferably a range 3 times to 9 times the height 53 in which the fluidized bed 50 is formed during operation.

In addition, the range of the first roughening-treated surface preferably includes, in the direction from the side surface 16U toward the side surface 15U (Y-direction of FIG. 2) in the side surfaces 13U and 14U, the range corresponding to which the nozzles for spraying the aqueous urea solution 32 are arranged. Specifically, it preferably includes the ranges of the region 13Ua of the first long-side side surface and the region 14Ua of the second long-side side surface that face the range in which the nozzles for spraying the aqueous urea solution 32 are arranged.

A range of the second roughening-treated surface is, in the inner wall surfaces of the side surfaces 13U to 16U and the top surface 12 of the granulation chamber 20U, a range excluding the first roughening-treated surface, and desirably adjacent to the first roughening-treated surface.

The arithmetic average roughness (Ra1) (JIS B 0601:1994) of the roughening-treated state (peaks and valleys) of the first roughening-treated surface is 0.35 to 5.0 µm and the average distance between local peaks (S1) (JIS B 0601:2001) of the peaks and valleys is 2 to 300 µm and preferably 2 to 50 µm. The arithmetic average roughness (Ra2) (JIS B 0601:1994) of the roughening-treated state (peaks and valleys) of the second roughening-treated surface preferably satisfies a relation of Ra1>Ra2 with the Ra1.

The relation between Ra1 and Ra2 is preferably Ra1/Ra2 of 1 to 35, and a relation between the average distance S1 of the peaks of the peaks and valleys of the first roughening-treated surface and the average distance S2 of the peaks of the peaks and valleys of the second roughening-treated surface is S1/S2 of 1 to 1000 and preferably 3 to 100. Note that roughness measurements for Ra, S and the like can be performed with a shape analysis laser microscope VK-X250 manufactured by KEYENCE CORPORATION or the like.

As a surface roughening method, various kinds of publicly-known blasting or blasting improved therefrom (for example, a method disclosed in JP-A 2017-170408 [method of treating surface of net-like filter and net-like filter] or JP-A 2012-040744 [method of treating surface of mold and mold having surface treated by said method]) can be used. In addition to blasting, the surface roughening can also be performed by such a method as chemical polishing (pickling, strong alkali), sandpaper, buffing, electropolishing, passive film treatment, coating (PVD, CVD, fluorine) or the like.

When the aforementioned surface roughening methods are applied to granulators to be newly built, a method of directly treating the inner wall surfaces of the granulation chamber 20U by surface roughening, or a method of affixing a metallic plate member which is separately treated by surface roughening to the inner wall surfaces of the granulation chamber 20U by a fixing method such as welding, bolting or the like can be used.

In addition, when the aforementioned surface roughening methods are applied to existing granulators, similarly to the above, a method of directly treating the inner wall surfaces of the granulation chamber by surface roughening, or a method of affixing a metallic plate member which is separately treated by surface roughening to the inner wall surfaces of the granulation chamber 20U by a fixing method such as welding, bolting or the like can be used. Moreover, a method of removing an existing wall of the granulation chamber 20U and replacing with a metallic plate member which is separately treated by surface roughening can also be used.

(2) Fluidized Bed/Spouted Bed Granulator Shown in FIGS. 4 to 6

Referencing to FIGS. 4 to 6, another embodiment of the fluidized bed/spouted bed granulator of the present invention is explained. In components shown in FIGS. 4 to 6, the same parts as in FIGS. 1 to 3 are given the same numerals.

A fluidized bed/spouted bed granulator 1A shown in FIGS. 4 to 6 is different from the fluidized bed/spouted bed granulator 1 shown in FIGS. 1 to 3 in that a high-pressure spray nozzle method is adopted, wherein both an aqueous urea solution which is introduced from the line for introducing the aqueous urea solution 31 and high-pressure air which is introduced from a line for introducing the high-pressure air 60 are introduced to spray nozzles 61 and a mixed gas of the aqueous urea solution and the high-pressure air is sprayed into the granulation chamber 20U from the spray nozzles 61 arranged in the bottom floor 19 which is formed of a perforated plate in the granulation chamber 20U.

The spray nozzles 61 for spraying the mixed gas of the aqueous urea solution and the air may be arranged in any of the side surfaces 13U to 16U of the granulation chamber 20U as described in, for example, WO-A 2006/094620.

In this example, as shown in FIG. 5, eleven spray nozzles 61 are arranged in Y-direction and six in Z-direction orthogonal to Y-direction. The number of the spray nozzles 61 can be adjusted based on production amounts of the urea particles to be produced in the granulator 1A and the arrangement of the spray nozzles 61 can be adjusted based on the shape of the granulator.

A range in which the plurality of spray nozzles 61 are arranged is a range sandwiched between the region 13Ua of the first long-side side surface and the region 14Ua of the second long-side side surface, and in a range sandwiched between the region 13Ub of the first long-side side surface and the region 14Ub of the second long-side side surface, the spray nozzles 61 are not arranged.

A proportion of a Y-direction length of the region 13Ua occupying a Y-direction length of the first long-side side surface 13U (or a Y-direction length of the region 14Ua occupying a Y-direction length of the second long-side side surface 14U) is determined by considering comprehensively the number of the spray nozzles 61 arranged in the granulator, temperature requirements of the urea particles collected from the line for collecting the urea particles 35, shapes of buildings in which the granulator is placed and the like.

A portion or all of inner wall surfaces of the granulation chamber 20U is treated by surface roughening. Here, the inner wall surfaces of the granulation chamber 20U are inner wall surfaces of the bottom floor 19, the four side surfaces 13U to 16U and the top surface 12 that constitute the granulation chamber 20U.

When a portion of the inner wall surfaces is treated by surface roughening, it is preferable that at least a portion of a height range from the bottom floor 19 up to the top surface 12 at least in the side surfaces 13U and 14U be treated by surface roughening, and it is more preferable that a portion of a height range from the bottom floor 19 up to the top surface 12 of the side surfaces 13U to 16U be treated by surface roughening. The height direction (X-direction of FIG. 4) range of the roughening-treated side surfaces 13U to 16U may be the same as in the case of the granulator 1 of FIGS. 1 to 3.

The height 53 in which the fluidized bed 50 is formed during operation of the granulator is preferably in the range of a height of 100 to 1000 mm, although it varies depending on sizes or operating conditions of the granulator 1A.

A crosswise-direction (a direction orthogonal to X-direction, Y-direction in FIG. 5) range of the roughening-treated inner wall surface of the granulator 20U preferably includes a crosswise-direction range corresponding to which the nozzles for spraying the aqueous urea solution 61 are arranged, and specifically, it preferably includes ranges of the region 13Ua of the first long-side side surface and region 14Ua of the second long-side side surface that face the range in which the spray nozzles 61 are arranged.

Moreover, when a portion of the inner wall surfaces of the granulation chamber 20U is treated by surface roughening, in addition to at least the aforementioned portion of the four side surfaces 13U to 16U, a portion of the top surface 12 is preferably further treated by surface roughening. When a portion of the top surface 12 is treated by surface roughening, the roughening-treated range of the top surface 12 may be the same as in the case of the granulator 1 of FIGS. 1 to 3.

A roughening-treated state (peaks and valleys) of the roughening-treated inner wall surface of the granulation chamber 20U may be the same as in the case of the granulator 1 of FIGS. 1 to 3.

In the granulation chamber 20U, when a portion of the inner wall surfaces of the side surfaces 13U to 16U is treated by surface roughening, the roughening-treated surface can be formed of first and second roughening-treated surfaces that are treated as two types of different roughening-treated surface forms. The respective ranges of the first and second roughening-treated surfaces may be the same as in the case of the granulator 1 of FIGS. 1 to 3. In addition, the respective roughening-treated states (peaks and valleys) of the first and second roughening-treated surfaces may be the same as in the case of the granulator 1 of FIGS. 1 to 3.

Surface roughening methods and methods for applying the surface roughening methods to the granulation chamber 20U may each be the same as in the case of the granulator 1 of FIGS. 1 to 3.

(3) Operating Method of Granulator and Effects of Surface Roughening of Inner Wall Surfaces of Granulation Chamber Taking the granulator 1 shown in FIGS. 1 to 3 as an example, a method for operating the granulator (method for producing urea particles by granulator 1) is explained, and along therewith, effects due to the inner wall surfaces of the granulator being treated by surface roughening are explained below.

Operating methods and operating conditions of the granulator 1 are not particularly limited as long as they are methods for producing urea particles by utilizing a fluidized bed, and for example, in addition to an operating method described in JP-B 4455643, operating methods described respectively in JP-B H4-63729, JP-A H10-216499 and JP-A H11-137988 described in the said publication, or operating methods altered from those operating methods can be performed.

In the inner wall surfaces of the granulation chamber 20U of the granulator 1 shown in FIG. 1, of the top surface 12, and the side surfaces 13U to 16U (first and second long-side side surfaces 13U and 14U and first and second short-side side surfaces 15U and 16U) and the bottom floor 19 that come in contact with the fluidized bed 50, at least the side surfaces 13U and 14U along the moving direction of the urea particles within the fluidized bed 50 are treated by surface roughening in the range from the bottom floor 19 up to the height 53 of the fluidized bed 50 formed during operation, and on the side of the top surface 12 above the said range, in the range at a height 1 to 10 times the height 53 of the fluidized bed 50 formed during operation in such a manner that a state of the roughening-treated surface (peaks and valleys) is in the range of Ra=0.35 to 5.0 μm and S=2 to 300 μm.

Inside the granulation chamber 20U of the granulator 1, the fluidized bed 50 in which the urea particles fluidize as if to furiously dance is formed on the bottom floor 19 by the urea seed particles which are continuously supplied from the line for introducing the urea seed particles 25 connected to the side surface 16U and the fluidizing air which is continuously introduced from the ventilation holes 42 of the perforated plate of the bottom floor 19 through the air accumulation chamber for the fluidizing air 20L1 and the line for introducing the fluidizing air 40.

Further, the spouted bed 51 which is a region where the particles are sparsely present is formed within the fluidized bed 50 by continuously supplying the spouting air from the outlets of the spouting pipes 41 which are regularly arranged in the bottom floor 19 through the air accumulation chamber for the spouting air 20L2 and the line for introducing the spouting air 45.

At the same time, the aqueous urea solution is continuously sprayed from the nozzle for spraying the aqueous urea solution 32 which is connected to the line for introducing the aqueous urea solution 31 and located about the center of each outlet surface of the spouting pipes 41. The urea particles to which the urea liquid is sprayed in the spouted bed 51 are blown up as indicated by the arrows 48, and thereafter, lose momentum and fall into the fluidized bed 50 and are caught in the surrounding spouted bed 51, and droplets of the aqueous urea solution are sprayed thereto again.

Since the fluidized bed 50 and spouted bed 51 are present in a mixed manner, the aqueous urea solution sprayed from the nozzles for spraying the aqueous urea solution 32 adheres to and is layered on the surface of the urea seed particles in a uniform and efficient manner, and the urea particles move from the side surface 16U toward the side of the side surface 15U while gradually increasing their particle size and are collected from the line for collecting the urea particles 35 connected to the side surface 15U.

In the collected urea particles, since urea particles of different sizes are mixed, particles that fall within a predetermined particle size range are separated by a sieve or the like and sent to the next step as a product. Particles that fall below the predetermined range and particles that exceed it may be supplied again, respectively as they are and after crushed into small pieces by a crusher or the like, to the granulation chamber 20U from the line for introducing the urea seed particles 25. Based on the number of required seed particles, the particles that fall within the predetermined particle size range may also be crushed into small pieces and supplied again to the granulation chamber 20U from the line for introducing the urea seed particles 25.

Thus, in the process for granulating the urea particles within the granulator 1, the following fine urea powders which are much smaller (e.g., 400 μm or less) than an average particle size of urea as a product (average particle size according to sieve analysis test method JIS 28815, ASTM E11) of 1 mm or more are generated in the granulation chamber 20U: fine fragments generated by collisions between the urea particles in a fluidizing state or between the urea particles and the wall surfaces of the granulation chamber 20U; microdroplets of the aqueous urea solution sprayed from the nozzles for spraying the aqueous urea solution 32 and solidified instead of adhering to the urea particles; fine fragments generated at the time of crushing the collected urea particles that exceed the predetermined size and introduced in a mixed manner with the accompanying seed particles from the line for introducing the urea seed particles 25; and the like. Such fine urea powders are generally referred to as dust.

While the dust generated within the granulation chamber 20U is so small and light that it is basically discharged along with air within the granulation chamber 20U from the exhaust line 23 connected to the exhaust outlet 22 riding on a flow of the air, some of the dust is not discharged but adheres to and deposits on the inner walls of the granulation chamber 20U under the influence of speeds or directions of local airflow, strengths of turbulence or the like. If the adhesion and deposition proceed and a limit of the amount is reached, the dust peels off to fall by its own weight as large lumps, which cause a problem of blocking the nozzles for spraying the aqueous urea solution 32 or impairing the fluidizing of the fluidized bed 50.

In the present invention, in order to solve or suppress this problem, in the inner wall surfaces of the granulation chamber 20U, places where the adhesion and deposition of dust are conventionally likely to occur are treated by the aforementioned surface roughening having the effect of significantly suppressing the adhesion and deposition of dust. The places where the adhesion and deposition of dust are conventionally likely to occur are the roughening-treated ranges pointed out in detail in the description of "(1) Fluidized bed/spouted bed granulator shown in FIGS. 1 to 3" mentioned above. When locations where dust adheres to and deposits on the inner walls of the granulation chamber 20U are different or expected to be different from the roughening-treated ranges due to differences in the shape of the granulation chamber 20U or the like, such locations may be treated by the aforementioned surface roughening.

As the present invention makes it difficult for dust to adhere to and deposit on the inner wall surfaces of the granulation chamber 20U, the adhesion and deposition of dust do not occur in the first place, or even if they occur, due to a limit of the amount to which the dust can adhere and deposit being lowered, the dust peels off by its own weight as small lumps with a size which does not cause problems before the adhesion and deposition proceed too far.

This makes it possible to prolong an interval between water cleaning tasks of the inner wall surfaces of the granulation chamber 20U, which are usually carried out to remove dust which enormously adheres to and deposits on the inner wall surfaces of the granulation chamber 20U or dust which has peeled off and fallen as large lumps and hinder the operation, and an operating rate of the granulator can be enhanced and maintenance costs can be reduced.

For example, when a conventional granulator having a granulation chamber with mirror-finished inner wall surfaces and the granulator 1 of the present invention are operated under the same conditions, the cleaning interval is about 0.5 to 1 month in the former, whereas the cleaning interval can be extended to about 1 to 3 months in the latter.

Even with the granulator 1A shown in FIGS. 4 to 6 or any other fluidized bed granulators, the same effect as in the granulator 1 shown in FIGS. 1 to 3 can be obtained by applying the present invention as the places where dust is likely to adhere to and deposit on the inner walls of the granulation chamber are common.

INDUSTRIAL APPLICABILITY

The fluidized bed granulator or fluidized bed/spouted bed granulator of the present invention can be utilized as an apparatus for manufacturing urea particles with an average particle size of 1 mm or more.

DESCRIPTION OF REFERENCE NUMERALS 1, 1A granulator
11 bottom surface of granulator
12 top surface
13-16 side surface
17 partition wall
19 bottom floor
20U granulation chamber
20L1 air accumulation chamber for fluidizing air
20L2 air accumulation chamber for spouting air
22 exhaust outlet
23 exhaust line
25 line for introducing urea seed particles
31 line for introducing aqueous urea solution
32 nozzle for spraying aqueous urea solution
35 line for collecting urea particles
40 line for introducing fluidizing air
41 spouting pipe
42 air hole of bottom floor 19
45 line for introducing spouting air
48 blown-up urea particle
50 fluidized bed
51 spouted bed
53 height of fluidized bed
60 line for introducing high-pressure air
61 spray nozzle

The invention claimed is:

1. A fluidized bed granulator or fluidized bed/spouted bed granulator into which urea seed particles, an aqueous urea solution and air are introduced to produce urea particles with an average particle size (according to sieve analysis test method JIS Z8815, ASTM E11) of 1 mm or more,
- the fluidized bed granulator or fluidized bed/spouted bed granulator including a box-shaped granulation chamber comprising a bottom floor, a top surface facing the bottom floor and side surfaces between the bottom floor and the top surface, and including a bottom surface facing the bottom floor on the opposite side of the top surface,
- wherein inner wall surfaces of the granulation chamber are formed of a metal material, the top surface or an upper part of the side surfaces includes an exhaust outlet, the side surfaces or the top surface includes an inlet for introducing the urea seed particles, the side surfaces include an outlet for the urea particles, the bottom floor or the side surfaces include inlets for introducing the aqueous urea solution, and the bottom floor or the bottom floor and the side surfaces include inlets for introducing the air,
- at least a portion of the inner wall surfaces of the granulation chamber is treated by surface roughening, the portion of the inner wall surfaces including a first roughening-treated surface and a second roughening-treated surface which are treated as two different types of roughening-treated surface forms with respect to each other, and
- either the first roughening-treated surface or the second roughening-treated surface has an arithmetic average roughness (Ra) (JIS B 0601:1994) of peaks and valleys in the surface treated by surface roughening is 0.35 to 5.0 μm and an average distance between local peaks(S) (JIS B 0601:1994) of the peaks and valleys is 2 to 300 μm.

2. The fluidized bed granulator or fluidized bed/spouted bed granulator according to claim 1, wherein at least a portion of the side surfaces between the bottom floor and the top surface is treated by surface roughening.

3. The fluidized bed granulator or fluidized bed/spouted bed granulator according to claim 1, wherein at least a portion of the side surfaces between the bottom floor and the top surface is treated by surface roughening and a portion of the top surface is further treated by surface roughening.

4. The fluidized bed granulator or fluidized bed/spouted bed granulator according to claim 1, wherein at least a portion of the side surfaces between the bottom floor and the top surface is treated by surface roughening and
- on the side of the top surface above the bottom floor, a height-direction range of the side surface treated by surface roughening is a range that includes a height range in which a fluidized bed is formed within the granulation chamber during operation of the granulator.

5. The fluidized bed granulator or fluidized bed/spouted bed granulator according to claim 1, wherein at least a portion of the side surfaces between the bottom floor and the top surface is treated by surface roughening and
- the side surface treated by surface roughening is a side surface not including the inlet for introducing the urea seed particles or the outlet for the urea particles and a range of the side surface treated by surface roughening corresponds to a range of the bottom floor in which the inlet for introducing the aqueous urea solution is arranged.

6. The fluidized bed granulator or fluidized bed/spouted bed granulator according to claim 1, wherein at least a portion of the side surfaces between the bottom floor and the top surface is treated by surface roughening,
- on the side of the top surface above the bottom floor, a height-direction range of the side surface treated by surface roughening is a range that includes a height range in which a fluidized bed is formed within the granulation chamber during operation of the granulator,
- the range that includes the height range in which the fluidized bed is formed within the granulation chamber during operation includes a height range up to which the fluidized bed is formed within the granulation chamber during operation and a height-direction range on the side of the top surface above the height in which the fluidized bed is formed, and
- the height-direction range on the side of the top surface above the height in which the fluidized bed is formed is a range 1 time to 10 times the height in which the fluidized bed is formed.

7. The fluidized bed granulator or fluidized bed/spouted bed granulator according to claim 6, wherein inner wall surfaces in the height-direction range on the side of the top surface above the height in which the fluidized bed is formed within the granulation chamber during operation include, in the range 1 time to 10 times the height in which the fluidized bed is formed, a first roughening-treated surface in which an arithmetic average roughness (Ra1) (JIS B 0601:1994) is 0.35 to 5.0 μm and an average distance between local peaks (S1) (JIS B 0601:1994) of the roughening-treated peaks and valleys is 2 to 300 μm, and include
- a second roughening-treated surface in a range that includes a height-direction range on the side of the top surface above the first roughening-treated surface, wherein an arithmetic average roughness (Ra2) (JIS B 0601:1994) of the inner wall surface of the second roughening-treated surface and the Ra1 satisfy a relation Ra1>Ra2.

8. The fluidized bed granulator or fluidized bed/spouted bed granulator according to claim 7, wherein,
- for the arithmetic average roughness (Ra1) (JIS B 0601:1994) of the inner wall surface of the first roughening-treated surface and the average distance between local peaks (S1) (JIS B 0601:1994) of the peaks and valleys of the said inner wall surface and
- the arithmetic average roughness (Ra2) (JIS B 0601:1994) of the inner wall surface of the second roughening-treated surface and the average distance between local peaks (S2) (JIS B 0601:1994) of the peaks and valleys of the said inner wall surface,
- Ra1 and Ra2 satisfy a relation Ra1/Ra2 of 1 to 35 and S1 and S2 satisfy a relation S1/S2 of 1 to 1000.

9. The fluidized bed granulator or fluidized bed/spouted bed granulator according to claim 7, wherein Ra1 is 0.35 to 5.0 μm and the average distance (S1) is 2 to 50 μm.

10. The fluidized bed granulator or fluidized bed/spouted bed granulator according to claim 1, wherein the granulation chamber includes the bottom floor formed of a perforated plate in which outlets of a plurality of spouting pipes are regularly arranged, the inlet for introducing the urea seed particles is connected to a top surface side relative to the bottom floor, and a spray nozzle for spraying the aqueous urea solution is located about the center of each outlet surface of the spouting pipes, such that the aqueous urea solution is sprayed to a fluidized bed formed in the granulation chamber together with spouting air jetted from the outlets of the spouting pipes.

11. A fluidized bed granulator or fluidized bed/spouted bed granulator into which urea seed particles, an aqueous urea solution and air are introduced to produce urea particles with an average particle size (according to sieve analysis test method JIS Z8815, ASTM E11) of 1 mm or more, the fluidized bed granulator or fluidized bed/spouted bed granulator including a box-shaped granulation chamber comprising a bottom floor, a top surface facing the bottom floor and side surfaces between the bottom floor and the top surface, and including a bottom surface facing the bottom floor on the opposite side of the top surface, wherein inner wall surfaces of the granulation chamber are formed of a metal material, the top surface or an upper part of the side surfaces includes an exhaust outlet, the side surfaces or the top surface includes an inlet for introducing the urea seed particles, the side surfaces include an outlet for the urea particles, the bottom floor or the side surfaces include inlets for introducing the aqueous urea solution, and the bottom floor or the bottom floor and the side surfaces include inlets for introducing the air, and at least a portion of the inner wall surfaces of the granulation chamber is treated by surface roughening, the inner wall surfaces including a first roughening-treated surface with an arithmetic average roughness Ra1, and including a second roughening-treated surface with an arithmetic average roughness Ra2, wherein Ra1>Ra2.

12. The fluidized bed granulator or fluidized bed/spouted bed granulator according to claim 11, wherein the arithmetic average roughness Ra1 (JIS B 0601:1994) of peaks and valleys in the first roughening-treated surface is 0.35 to 5.0 μm.

* * * * *

UNITED STATES PATENT AND TRADEMARK OFFICE
CERTIFICATE OF CORRECTION

| | |
|---|---|
| PATENT NO. | : 12,128,379 B2 |
| APPLICATION NO. | : 17/909149 |
| DATED | : October 29, 2024 |
| INVENTOR(S) | : Keishi Sano et al. |

Page 1 of 1

It is certified that error appears in the above-identified patent and that said Letters Patent is hereby corrected as shown below:

On the Title Page

Item (72):
Change "Kelji Mase, Tokyo (JP)" to ---Kelji Mase, Edogawa (JP)---
Change "Shozo Ishibashi, Tokyo (JP)" to ---Shozo Ishibashi, Edogawa (JP)---
Change "Tetsuya Kawabe, Tokyo (JP)" to ---Tetsuya Kawabe, Edogawa (JP)---

Signed and Sealed this
Thirty-first Day of December, 2024

Derrick Brent
*Acting Director of the United States Patent and Trademark Office*